No. 771,335. PATENTED OCT. 4, 1904.
W. E. SYMONS.
DISTRIBUTION AND INFORMATION BOARD.
APPLICATION FILED MAR. 9, 1904.
NO MODEL.

Witnesses
Jas. K. McCathran
Louis G. Julihn

Wilson E. Symons, Inventor

By C. G. Siggers
Attorney

No. 771,335.

Patented October 4, 1904.

UNITED STATES PATENT OFFICE.

WILSON E. SYMONS, OF CLEBURNE, TEXAS.

DISTRIBUTION AND INFORMATION BOARD.

SPECIFICATION forming part of Letters Patent No. 771,335, dated October 4, 1904.

Application filed March 9, 1904. Serial No. 197,229. (No model.)

*To all whom it may concern:*

Be it known that I, WILSON E. SYMONS, a citizen of the United States, residing at Cleburne, in the county of Johnson and State of Texas, have invented a new and useful Distribution and Information Board, of which the following is a specification.

My present invention relates to a distribution and general information board for railways, and more particularly to such a board designed especially to afford a graphic reference-chart by means of which the superintendent of motive power or other official may instantly determine the manner in which locomotives are distributed over the railway system, the characteristics of each engine, its condition, the class of service in which it is engaged, its ownership, and various other information respecting individual locomotives or groups of locomotives—as, for instance, those assigned to different divisions or classes of service.

The primary object of the invention aside from the recording of the various kinds of information desired is to eliminate the necessity for reference to a vast number of reports, keys, and indexes by providing the board with a graphic representation or map of the railway system upon which movable pegs or other objects, each bearing identifying and descriptive data of a locomotive, may be placed in those divisions or at those points of the road to which the engines are assigned and in positions which will indicate the general condition of the locomotives represented by the pegs.

A further object of the invention is to associate with the map keys explanatory of the symbols affixed to the pegs and recapitulation-charts by means of which certain information respecting the entire motive power of the road may be determined—as, for instance, the number of engines in a given division, the types of such engines, the number assigned to each class of service, the number burning various kinds of fuel, &c.

A further object of the invention is to facilitate the location of engines in roundhouses, repair-shops, and in switch service.
Subordinate to these general objects are others which will appear during the course of the succeeding description of the illustrated embodiment of the invention.

Figures 1, 2:
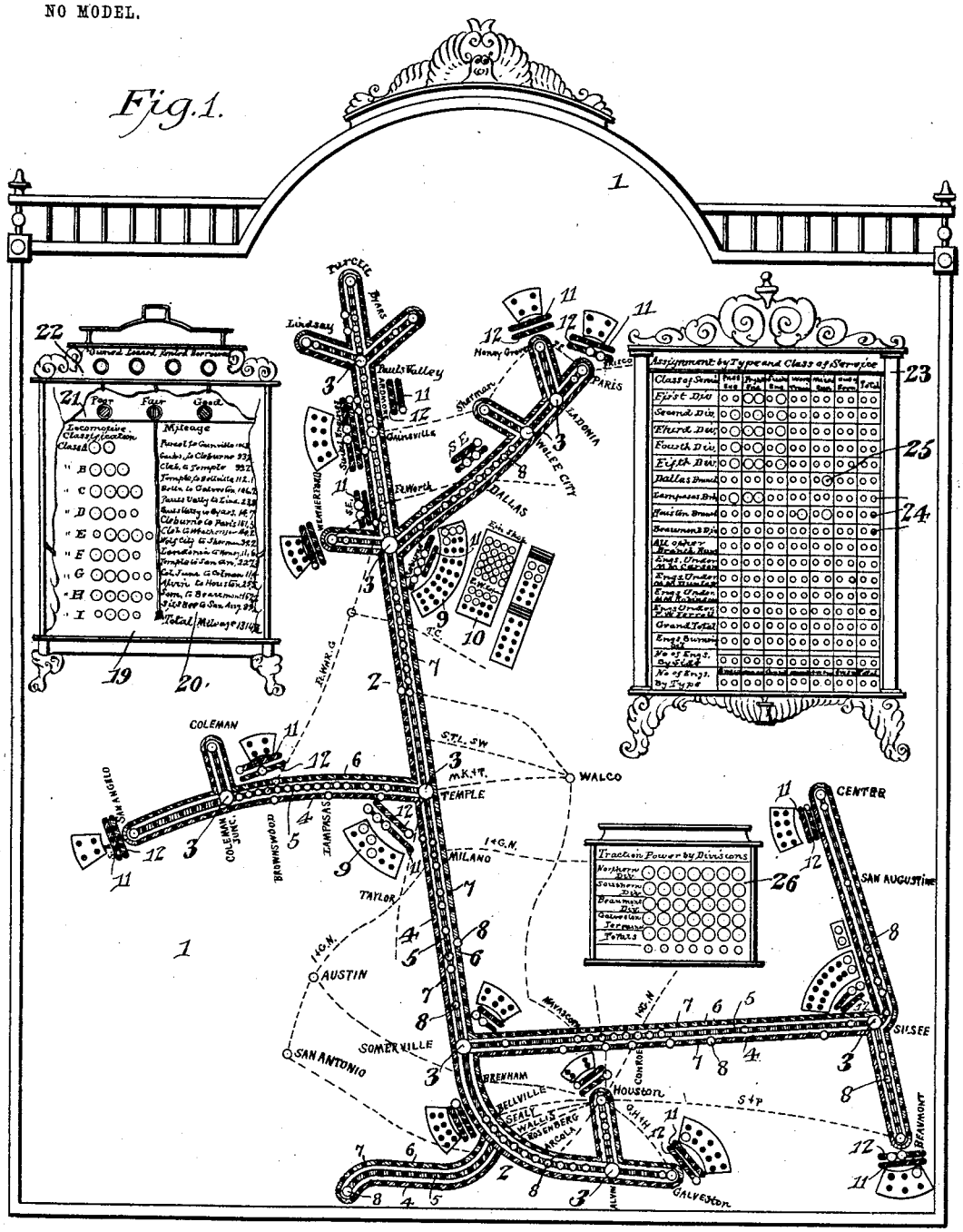
Figure 3:
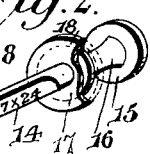

In the drawings, Figure 1 is a face view of my distribution and information board equipped in accordance with the invention. Fig. 2 is a perspective view of one indicator or peg, and Fig. 3 is an end view thereof.

Like numerals of reference are employed to designate corresponding parts throughout the several views.

1 indicates the board, which is preferably more or less ornamental in appearance and is designed to be placed in a railroad-office for ready reference. Upon this board is imprinted or otherwise displayed a railway-map 2—to wit, an approximation of the lines of a given railway system including indications— as, for instance, plain circles 3—marking the location of terminal stations, usually the cities or towns at the opposite ends of the divisions or subdivisions of the railway system. This route-map is shown in parallel stripes 4, 5, and 6 of contrasting color, preferably red, gold, and blue, indicative of the condition of locomotives. For instance, the red stripe 4 has been arbitrarily selected to indicate poor condition, the gold stripe 5 fair condition, and the blue stripe 6 good condition. Along each of the condition-stripes of the map the board is provided with openings or sockets 7 for the reception of engine pegs or indicators 8. The engine-pegs 8, each of which represents one of the locomotives of the system, are distributed over the map in a manner corresponding to the distribution of locomotives over the system—that is to say, the locomotives of a given division of the road are located on a corresponding division of the map and on a red, gold, or blue stripe, accordingly as the locomotive is in poor, fair, or good condition, so that the condition and division assignment of any locomotive of the system, as well as the general distribution and condition of all of the locomotives, may be ascertained by a glance at the map.

In order that the map may serve as a reference in connection with all of the locomotives, even those out of service and others employed for switching purposes, the map also bears diagrammatic representations of roundhouses—as, for instance, at 9—shops 10, and red and blue switch-stripes 11 and 12. The switch-stripes are associated with such divisions of the road as require the services of switch-engines, and these stripes, as well as the roundhouses and shops, are provided with peg recesses or sockets for the reception of the engine-pegs. Pegs representing those engines in switch service are inserted in the sockets in the switch-stripes at appropriate points, and engines in roundhouses or shops are similarly indicated by pegs in the roundhouse and shop plans on the map. Thus it is not only easy to determine the approximate location and condition of all the locomotives in train service, but a glance at the map will also show what locomotives are acting as switch-engines and at what points and also what locomotives are out of service and their exact location in the roundhouses or shops, as the case may be.

In addition to the route-map of the railway system concerned the board may bear other data—as, for instance, other railroads, whose lines are preferably indicated in dotted lines, as shown.

The engine-pegs 8 are preferably constructed as shown in Fig. 2. A cylindrical portion 13, having one side flattened, as indicated at 14, is designed to be inserted in the socket and is equipped with a head 15 at the extremity of a neck 16, between which and the cylindrical portion 13 is an annular flange 17. This flange is designed to rest against the face of the board, so as to leave the head and neck protruding to afford a handle by means of which the peg may be manipulated. As has been stated, each peg represents a particular engine and bears upon its head an identifying-mark—as, for instance, the engine-number—for example, 0183. It is also desirable to have each peg bear certain descriptive data by means of which the leading characteristics of the engine represented by the peg may be instantly determined. Thus the head 15 is painted a color indicative of ownership or title, different colors being arbitrarily selected to indicate that the engine is owned, leased, rented, or borrowed, as the case may be, the head of the illustrated peg being yellow, which in this instance indicates absolute ownership by the road whose system is indicated on the board. Below the engine-number on the head of the peg is a type-letter indicating the type of the engine. For instance, the letters "A" to "I" may be selected to indicate four, six, or eight wheeled switch-engines, an eight-wheel passenger-engine, a ten-wheel engine with trailer, a Mogul, a ten-wheeler, a consolidation, and a Columbia, other letters being employed to represent such additional types as may be in use. The pin illustrated in the drawings bears the letter "F," signifying to one who understands the symbol that engine 0183 owned by the road is of the Mogul type. The head of the peg also bears a symbol—as, for instance, a black crescent—which has been arbitrarily selected to indicate that the engine is an oil-burner. On the flattened face 14 of the peg are indicated the diameter of the cylinder and the stroke—for instance, seventeen by twenty-four is shown—and on the extremity of the peg are imprinted numbers indicating the outside diameter of the driving-wheels in inches. Of course in addition to these various symbols the peg may bear any other information desired. For example, I have shown the peg surrounded by a bright-colored annular collar 18 of somewhat greater diameter than the flange 17, so as to be easily observable when the peg is inserted in the board. This collar may be given any desired significance—as, for instance, that the fire-box of the engine needs attention.

It will thus be seen that when this peg is properly placed in the board an official may see at a glance to what division engine 0183 is assigned, that its condition is good, fair, or poor, as the case may be, that it is a Mogul burning oil, and that its fire-box needs attention. If then he desires to know the dimensions of the cylinders and drivers and of the stroke, it is simply necessary to remove the peg from its socket in order to secure the desired information.

After an engine the position of whose peg on the blue stripe indicates first-class condition has made sufficient mileage or has deteriorated from other cause the peg is transferred to the gold stripe, indicating fair condition, and after further deterioration is removed to the red stripe, indicating poor condition, from whence it is removed to one of the shops. During these changes the peg will always indicate the location and condition of the locomotive, and after repairs have been made the engine will be broken in in a roundhouse and finally restored to the road in good condition, the peg indicating at all times just where the engine may be found and in what shape.

The subject-matter thus far described constitutes a complete embodiment of my invention in one aspect thereof. It is desirable, however, to equip the board with keys explanatory of the information-symbols displayed on the pegs and charts for conveniently ascertaining the assignment of locomotives by type and class of service and the totals by divisions, service, and type, as well as the totals of each type temporarily out of service, &c. Thus at the upper left-hand corner of the board is displayed a locomotive classification-key 19. This key consists of a series of letters indicating the classes or types and opposite each letter an illustration of the wheel arrangement of engines of that particular class or type—for instance, "A—2," drivers to a side; "B—3," drivers; "C—4," drivers, &c. If the official is unfamiliar with the type-symbols on the pegs, it is simply necessary for him to refer to the type or classification chart 19. Adjacent to the classification-key 19 is a mileage-key 20, showing the mileage between the various points of the road to enable a record to be kept of the miles run by an engine engaged in a particular service, it being understood that under normal conditions the condition of a locomotive in a given service may be more or less accurately judged by the number of miles run.

Above the classification and mileage keys 19 and 20 is a condition-key 21, which may, for instance, be in the form of three disks corresponding in color to the condition-stripes of the map and labeled "Poor," "Fair," and "Good," so that the significance of the colors of the condition-stripes can be instantly determined. Above the key 21 is what may be termed an "ownership-key" 22, preferably consisting of several—say four—disks colored to correspond to the colors of the engine-peg heads and labeled "Owned," "Leased," "Rented," and "Borrowed."

It is of course to be understood that this particular arrangement of keys is arbitrary and may be widely varied as to relative location as well as to the colors and symbols and the significance thereof, this feature of the invention being designed merely to provide keys whereby the significance of the distinguishing characteristics of the map and pegs may be quickly determined.

At the upper right-hand corner of the board or at any other suitable point is displayed what I shall term the "recapitulation-chart" 23, divided and cross-divided to form vertical and horizontal columns having peg-sockets 24 for the reception of pegs 25. The horizontal columns are devoted to divisions of the system and to certain other special classifications—for instance, engines under different superintendents, grand totals by service, totals by service burning oil, totals by service and by type. The vertical columns are devoted to service classification and to division-totals. In other words, this chart 22 is intended to contain a general summary of all engines by assignment, type, and class of service, it being possible to ascertain at a glance the total number of engines of any particular type in the whole system or in any particular division, the total number of engines of all types and classes in each division, &c. It is also desirable to equip the board with a traction-chart 26, designed to show the traction-power of the entire system of divisions.

It will of course be understood that while the board illustrated and described has been designed with special reference to the motive equipment of the system the invention is by no means restricted to such application, as it is clear that all of the rolling-stock or any particular class of rolling-stock may be represented by the pegs, the symbols carried thereby being of material significance appropriate to the particular class of rolling-stock or engines represented. I have therefore referred to the pegs 8 as "indicators" in the subjoined claims, since their essential function is to indicate irrespective of what is indicated or of the particular form of the indicator.

It is thought that from the foregoing the nature of my invention and the advantages accruing therefrom will be obvious; but while the illustrated embodiment is believed at this time to be preferable I desire to reserve the right to effect such changes, modifications, and variations of the illustrated arrangment as may fall fairly within the scope of the protection prayed.

What I claim as new is—

1. A locomotive distribution and information board, having displayed thereon a railway-map, defined by lines or stripes following the line of the road, each stripe being significant of a different condition of the locomotives, and movable locomotive-indicators located on the line of the road and on the stripe or stripes appropriate to the condition of the locomotives represented.

2. A locomotive distribution and information board having a map of the railway system displayed in stripes of contrasting colors indicating different conditions of the locomotives, and locomotive-indicators distributed over the map and located on the different stripes appropriate to the condition of the locomotives represented by the respective indicators.

3. A locomotive distribution and information board having a map of the railway system displayed thereon in colored stripes and also having openings distributed along each stripe, and indicator-pegs insertible in any of said openings and bearing identifying-symbols.

4. A locomotive distribution and information board having a map of the railway system displayed thereon in colored condition-stripes and also having openings distributed along each stripe, and indicator-pegs representing the locomotives and bearing identifying and descriptive symbols, said pegs being inserted in appropriate openings of the board to indicate the location and condition of the locomotives represented.

5. A locomotive distribution and information board having displayed thereon a map of the railway system comprising colored stripes symbolical of the condition of the locomotives, peg sockets or openings distributed along each of the stripes, indicating-pegs inserted in said openings and each bearing symbols identifying and describing the particular locomotive represented by the peg, and keys explanatory of the symbols of both the map and pegs.

6. A locomotive distribution and information board equipped with a map of the railway system, indicator-pegs adapted to be inserted in the board along the line of the map and bearing identifying and descriptive symbols relative to the particular locomotives represented by the respective pegs, keys explanatory of the symbols, a recapitulation-chart showing the division assignments of the locomotives by type and class of service, and a traction-chart showing the traction-power of the locomotives by divisions.

7. A locomotive distribution and information board having a map of the railway system displayed thereon in lines of contrasting color indicating good, fair, and poor condition of the locomotives, engine-pegs each representing a locomotive and adapted to be inserted in the board at that point of the map corresponding to the assignment of the engine and in that stripe indicating the condition of the engine and bearing symbols identifying the locomotive represented and descriptive of the main characteristics thereof, as, for instance, the cylinder and wheel dimensions and the stroke, the general type of the engine and the class of fuel burned, keys explanatory of the significance of the symbols, a recapitulation-chart accounting for the entire motive equipment of the system by assignment, type, class of service and fuel burned, and a traction-chart showing the tractive power of the motive equipment of the respective divisions of the system.

8. A locomotive distribution and information board having a map of the railway system displayed thereon in lines of contrasting color indicating the condition of the locomotives, engine-pegs each representing a locomotive and adapted to be inserted in the board at that point of the map corresponding to the assignment of the engine and in that stripe indicating the condition of the engine, and bearing symbols identifying the locomotive represented and descriptive of the main characteristics thereof.

9. A locomotive distribution and information board, having the map of the railway system displayed thereon in stripes of contrasting color indicating the condition of the locomotives, engine-indicators, each representing a locomotive, adapted to be mounted on the board at that point of the map corresponding to the assignment of the engine and on that color-stripe indicating the condition of the engine, said indicators bearing symbols identifying the locomotives represented.

In testimony that I claim the foregoing as my own I have hereto affixed my signature in the presence of two witnesses.

WILSON E. SYMONS.

Witnesses:
J. H. BEGGS,
A. E. MEYER.